(12) United States Patent
Maeda

(10) Patent No.: US 7,057,817 B2
(45) Date of Patent: Jun. 6, 2006

(54) OPTICAL LENS DEVICE AND PRODUCTION METHOD THEREOF

(75) Inventor: Takanori Maeda, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 41 days.

(21) Appl. No.: 10/189,474

(22) Filed: Jul. 8, 2002

(65) Prior Publication Data

US 2003/0011885 A1    Jan. 16, 2003

(30) Foreign Application Priority Data

Jul. 10, 2001    (JP)    ............................. 2001-209607

(51) Int. Cl.
*G02B 27/28*    (2006.01)
*G02B 7/00*     (2006.01)

(52) U.S. Cl. ...................................... 359/497; 359/494

(58) Field of Classification Search ................ 359/492, 359/499, 500, 501, 619, 577–590, 819–830, 359/494, 497, 642; 235/487; 396/530
See application file for complete search history.

(56) References Cited

U.S. PATENT DOCUMENTS

| 3,686,480 | A | * | 8/1972 | Bowerman | .................. 235/487 |
| 4,247,190 | A | * | 1/1981 | Hashimoto et al. | ......... 396/530 |
| 4,981,342 | A | * | 1/1991 | Fiala | .......................... 350/403 |
| 6,618,200 | B1 | * | 9/2003 | Shimizu et al. | ............. 359/619 |

OTHER PUBLICATIONS

IBM Technical Disclosure Bulletin, "Method For Aligning The Axes of a Birefringent Bifocal Lens System," vol. 27, No. 11, Apr. 1985, pp. 6674-6675.*

* cited by examiner

*Primary Examiner*—Drew A. Dunn
*Assistant Examiner*—Joshua L. Pritchett
(74) *Attorney, Agent, or Firm*—Young & Thompson

(57) ABSTRACT

The present invention provides an optical lens device capable of providing an optical pickup with a stable performance by restraining the influence of the birefringence even in the case of using a plurality of resin lenses. In the optical lens device having two lenses, by disposing the two lenses relative to each other such that the birefringence directions of the lenses form a predetermined angle, preferably 180 degrees, the influence of the birefringence can be reduced as a whole and an optical lens device with a good characteristic can be obtained.

14 Claims, 6 Drawing Sheets

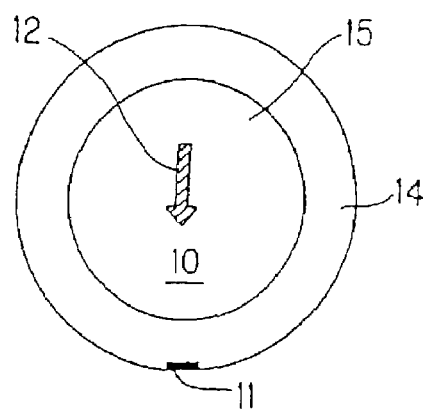
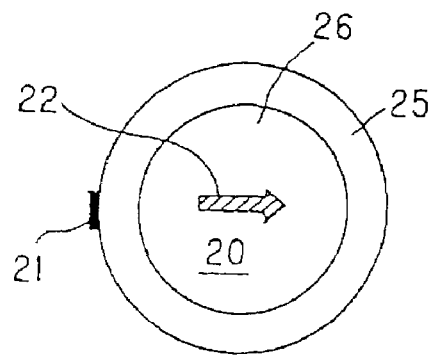
Fig. 2A                    Fig. 2B
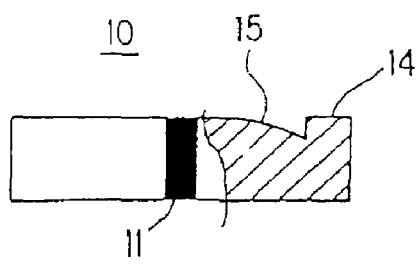
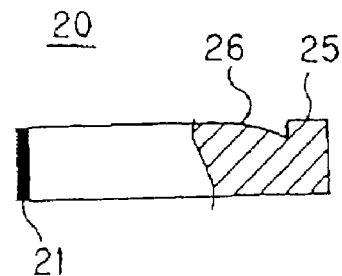
Fig. 2C                    Fig. 2D

RESIN MATERIAL

OPTICAL LENS DEVICE AND PRODUCTION METHOD THEREOF

BACKGROUND OF THE INVENTION

1. Field of the Invention

The present invention belongs-to the technological field of an optical lens device having a plurality of resin lenses, and in particular it relates to an optical lens device suitable for an objective lens for an optical pickup to be used for recording or reproduction of information on or from an optical disk.

2. Description of Related Art

According to the recent trend toward a high recording density of an information recording medium such as an optical disc, an objective lens having a high numerical aperture is used for recording or reproduction of the information recording medium to meet the demand for storing a large amount of information. In the case the numerical aperture required to the objective lens is up to about 0.65, an aspheric lens produced by molding a resin can be used. However, in the case the required numerical aperture exceeds that level, the objective lens cannot be configured by a single lens, and hence it is necessary to configure the objective lens with high numerical aperture by a combination of two or more lenses. For example, the Japanese Patent Application Laid-Open under No. 2000-131603 discloses a configuration of an objective lens with a high numerical aperture by a combination of a plurality of lenses.

On the other hand, for the purpose of reducing the weight of the objective lens to enable a high speed access to recording information, a resin lens such as a plastic lens is used as the objective lens. For example, the Japanese Patent Application Laid-Open under No. 5-281496 discloses the use of a plastic lens as an objective lens for reproduction of an optical disc.

Since such a resin lens is produced by molding a resin, unevenness of the thickness and like tends to be generated in the produced lens depending on the molding method, introducing the birefringence. Therefore, in the case the resin objective lens is used as an optical pickup for a recording or reproducing device of an optical disc, due to the birefringence of the lens, the polarization state may be changed. For example, a light spot which should be circularly-polarized is elliptically-polarized. The phenomenon has not been so problematic in a conventional optical pickup using an objective lens of a relatively low numerical aperture.

However, recording or reproducing information on or from a recent optical disc of high recording density, since a small size light spot should be formed by an objective lens having a numerical aperture larger than 0.7, the birefringence problem of the resin objective lens cannot be ignored. That is, since the size and the shape of the light spot are changed due to the polarization state of the laser light irradiated on the recording surface of an optical disc through the objective, the light spot of the designed shape cannot be formed. Thereby, a problem of a high error generation rate arises in recording or reproduction of information on or from a high recording density optical disc. In particular, in the case of configuring the objective lens by a combination of two resin lenses, in order to realize a high numerical aperture and a good light collecting performance, the polarization state change derived from the birefringence becomes large so that it is difficult to realize an optical pickup with a stable performance.

SUMMARY OF THE INVENTION

The present invention has been achieved in view of the above-mentioned problems, and its object is to provide an optical lens device capable of providing an optical pickup with a stable performance by restraining the influence of the birefringence even in the case of using a plurality of resin lenses.

According to one aspect of the present invention, there is provided an optical lens device including two lenses, each of the two lenses having birefringence in a specific direction in a surface of the lens, the two lenses being positioned relative to each other such that directions of the birefringence of the lenses form a predetermined angle.

In accordance with the above optical lens, each of the two lenses has the birefringence in a specific direction in the lens surface. By disposing the two lenses so as to have the birefringence directions forming a predetermined angle, the influence of the birefringence can be reduced as a whole, and hence an optical lens device with a good characteristic can be obtained.

In a preferred embodiment, the predetermined angle may be substantially 90 degrees. By this, the influence of the birefringence can be eliminated effectively.

Each of the two lenses may have at least one positioning mark at an end part in the birefringence direction, and the two lenses may be positioned such that radial directions of the lenses including the positioning marks substantially orthogonal with each other. Since the positioning marks formed on the lens end part show the direction of the birefringence of the lens, by disposing the two lenses such that the positioning marks are substantially orthogonal, the birefringence directions can be directed substantially perpendicularly so that the influence of the birefringence can be eliminated effectively.

One of the two lenses may have at least one positioning mark at an end part in the birefringence direction and the other of the two lenses has at least one positioning mark at an end part in a direction substantially orthogonal to the direction of the birefringence, and the two lenses may be positioned such that the positioning marks coincide with each other. By disposing the positioning marks formed in the two lenses coincide with each other, the birefringence directions of the two lenses can easily be directed orthogonal so that the influence of the birefringence can be eliminated easily.

Specifically, one of the positioning marks may have a width corresponding to a tolerance. By this, since one of the positioning marks has a width corresponding to the tolerance and the two lenses are disposed such that the positioning marks coincide with each other within the width range, the influence of the birefringence can be eliminated by the accuracy within the tolerance.

In a preferred embodiment, the positioning marks may be formed on both the end parts of the lens in the birefringence direction or in the direction substantially orthogonal to the birefringence direction. Since the positioning marks are formed on the both end parts of the lenses, at the time of disposing the positioning marks of the two lenses at a predetermined position, the two lenses can be positioned easily by rotating one of the lenses less than 180 degrees.

One of the positioning marks may be a recess part formed on one of the lens and having a predetermined width, and the other of the positioning marks may be a projection part formed on the other one of the lens and having a shape to be received in the recess part. By this, since the positioning marks are formed as a recess part and a projection part, the relative positioning of the lenses can be facilitated, and the displacement of the relative positions of the lenses after positioning can be prevented.

At least one of the positioning marks may be a cutting mark formed in a production process of the lens. By this, since the cutting mark formed at the time of production of the lens can be used as the positioning mark, an additional process of forming the positioning mark in the lens can be eliminated and the production process can be simplified.

The optical lens device may further include an assembly for supporting the two lenses on an identical axis. By fixing each of the two lenses to the assembly, positioning with each other can be carried out and the displacement of the relative positions after positioning can be prevented.

One of the two lenses may be integrally mounted in a receiving part formed in the other lens. By this, since the receiving part for receiving the other lens is formed in one of the lenses, a separate assembly can be eliminated and the structure of the lens device can be simplified and miniaturized.

Specifically, the numerical aperture produced by the two lenses may be not smaller than 0.7 and not larger than 1. Even in the case of producing an optical lens device of high numerical aperture by two lenses, the influence of the birefringence of the two lenses can be eliminated so that an optical lens device with a high numerical aperture and a high performance can be obtained.

According to another aspect of the present invention, there is provided a production method of an optical lens device including the steps of: mounting a first lens on an assembly and mounting a second lens on the assembly such that directions of birefringence of the lenses forms a predetermined angle.

According to the production method, since the two lenses are mounted on the assembly such that the birefringence directions form a predetermined angle, the influence of the birefringence of the lenses can be eliminated and a high performance optical lens device can be produced.

According to still another aspect of the present invention, there is provided a production method of an optical lens including the steps of: disposing a second lens within a receiving part formed in a first lens such that a birefringence direction of the second lens and a birefringence direction of the first lens form a predetermined angle, and fixing the second lens to the first lens.

According to the production method, the second lens is fixed within the receiving part formed in the first lens and the lenses are mounted with the birefringence directions forming a predetermined angle. Therefore, the influence of the birefringence of the lenses can be eliminated and a high performance optical lens device can be produced.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 2A to 2D are plan views and side views showing the shape of the lenses shown in FIG. 1.

DETAILED DESCRIPTION OF THE INVENTION

Hereinafter, with reference to the drawings, preferable embodiments of the present invention will be explained.

[Optical Lens Device]

Figure 1:
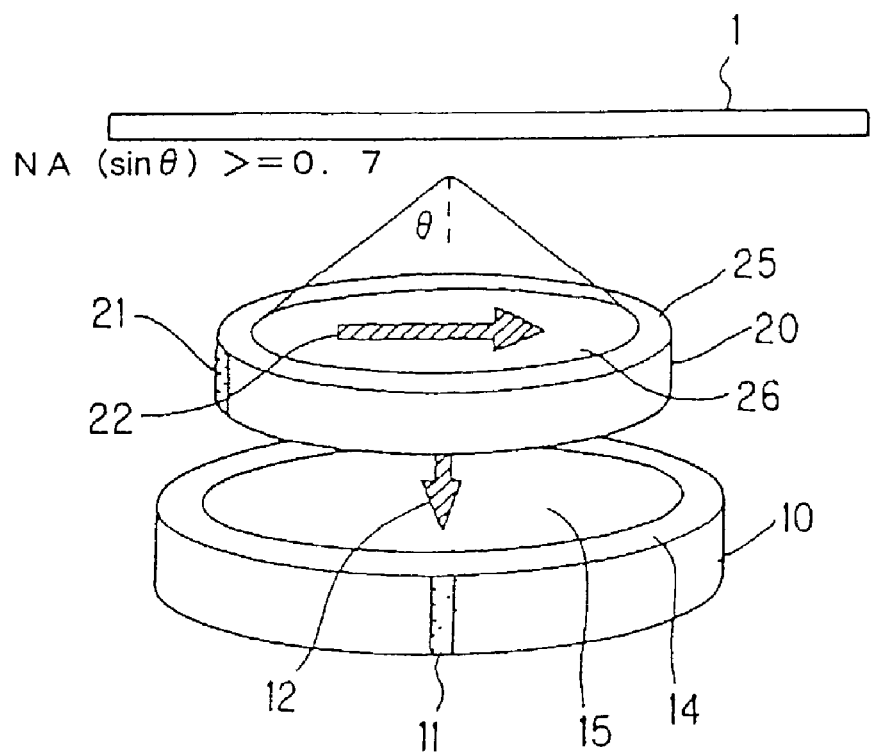
FIG. 1 is a diagram showing the concept of the configuration of an optical lens device according to the present invention having a combination of two lenses.

FIG. 1 schematically shows the configuration of an optical lens device according to a first embodiment of the present invention. The optical lens device according to this embodiment is to be used for an optical pickup for an optical disc recording or reproducing device, and configured as a combination two resin lenses, that is, a first lens 10 and a second lens 20. FIG. 1 schematically shows the state of irradiating a laser beam onto the information recording surface of the optical disc 1 by the optical lens device, serving as an objective lens, having the first lens 10 and the second lens 20. In FIG. 1, both of the first lens 10 and the second lens 20 are a resin lens produced by molding resin, for example, an acrylic based resin.

FIG. 2A is a plan view of the first lens 10 viewed from the upper direction in FIG. 1. FIG. 2C is a side view of the first lens 10 provided partially as a cross-sectional view. As shown in FIGS. 1, 2A and 2C, the first lens 10 includes a spherical part 15 at the inner circumference side and an aspheric part 14 at the outer circumference thereof. The spherical part 15 shaped to naturally project in the upper direction in FIG. 1 is apart having a light collecting function as the objective lens. The aspheric part 14 on the outer circumference side functions as a supporting part in the production of the objective lens as described later.

The first lens 10 has a gate mark 11 on the outer circumference surface. The gate mark 11 has a function as a positioning mark for positioning the first lens 10 and the second lens 20 relative to each other. The gate mark 11 can be provided, for example, at a cut surface at the time of cutting the lens in the process of molding the lens by a resin (therefore, hereinafter it is referred to also as the "cutting mark").

FIG. 2B is a plan view of the second lens 20 viewed from the upper direction in FIG. 1. FIG. 2D is a side view of the second lens 20, provided partially as a cross-sectional view. As shown in FIGS. 1, 2B and 2D, the second lens 20 has the same configuration as that of the first lens 10 except that the diameter thereof is smaller than that of the first lens 10. That is, the second lens 20 has a spherical part 26 of a projected shape at the inner circumference side, and an aspheric part 25 at the outer circumference side. The second lens 20 also has a gate mark 21 at the outer circumference surface thereof.

Each of the first lens 10 and the second lens 20 has a birefringence in the direction shown by the arrows 12 and 22. The birefringence direction is determined as a whole by the resin flow direction at the time of producing the lens by molding the resin.

Figure 3:
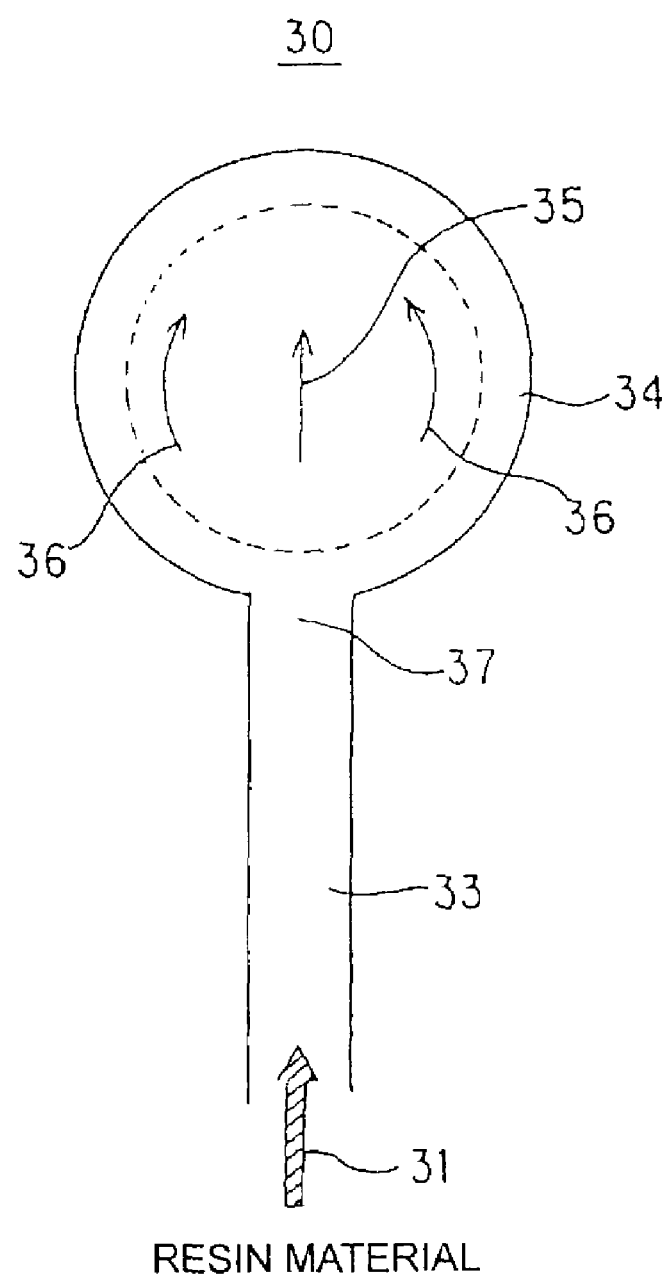
FIG. 3 is an explanatory diagram showing the state of production of a resin lens.

FIG. 3 schematically shows the method of molding the first lens 10 and the second lens 20. A mold 30 shown in FIG. 3 has a narrow injection path 33, a round part 34, and a gate part 37 connecting the injection path 33 and the round part 34. In FIG. 3, a resin material is injected into the mold 30 in the arrow 31 direction. The resin material passes through the injection path 33 and the gate part 37 so as to enter the round part 34. Since the resin material is injected in the arrow 31 direction, the resin material entered the round part 34 moves partially straightly as shown by the arrow 35 and moves partially curvedly along the inner circumferential wall of the round part 34 as shown by the arrows 36. After injecting a predetermined amount of the resin material by a constant pressure, the injection is stopped. Then, by hardening the resin material in the mold, a resin lens can be produced. At that time, since the resin material in the round part 34 moves along the arrows 35 or 36 according to the structure of the mold 30, unevenness of the resin material is generated in the completed lens, and consequently the birefringence is produced in the arrow 35 direction.

Thereafter, by cutting the hardened resin material at the gate part 37, the first lens 10 or the second lens 20 can be obtained. As it is observed from FIG. 1 and FIGS. 2A to 2D, the lens diameter direction including the gate mark (cutting mark) corresponding to the gate part 37 coincides with the birefringence direction (the arrow 35 direction in FIG. 3 and the arrow 12, 22 direction in FIG. 1 and FIG. 2). Namely, the diameter direction including the gate mark 11 is identical to the arrow 12 direction, and the diameter direction including the gate mark 21 is identical to the arrow 22 direction. On the surface of the gate mark (cutting mark) generated by cutting the resin, a cut or abraded mark remains. Since in general the cutting mark is translucent, the gate mark can be visually recognized. Therefore, the gate marks 11 and 21 can be used as a positioning mark of the first lens 10 and the second lens 20.

In the present invention, a resin objective lens of a 0.7 or more numerical aperture is configured by the combination of the first lens 10 and the second lens 20. Here, it is characteristic that the two lenses 10 and 20 are disposed such that the birefringence directions 12 and 22 of the two lenses form a predetermined angle, more specifically, the birefringence directions being substantially orthogonal (by 90 degrees) as shown in FIG. 1.

In this embodiment, as shown in FIG. 1, the gate mark 11 and the gate mark 21 are formed in the first lens 10 and the second lens 20, respectively, such that the lens diameter direction including the gate mark 11 coincides with the birefringence direction 12 and the lens diameter direction including the gate mark 21 coincides with the birefringence direction 22. That is, the birefringence direction 12 is the diameter direction including the gate mark 11, and the birefringence direction 22 is the diameter direction including the gate mark 21. Therefore, the two lenses are disposed such that the diameter direction including the gate mark 11 and the diameter direction including the gate mark 21 form a predetermined angle, preferably substantially orthogonal.

The birefringence of the resin lens is determined basically by the resin flow direction at the time of molding. That is, according to the resin flow direction, the refractive indices of the ordinary light and the extraordinary light differ so that polarization is generated in a transmitted light flux. Since the ordinary light direction and the extraordinary light direction are orthogonal, by combining the two resin lenses such that the axes of the birefringence are directed substantially orthogonal with each other, the polarization generated in a transmitted light can be restrained. Therefore, in order to easily confirm the angle formed by the birefringence directions of the lenses at the time of assembling the objective lens, the first lens 10 and the second lens 20 are disposed such that the gate marks 11 and 21 are positioned with the angle of substantially 90 degrees when the two lenses 10 and 20 are disposed at an appropriate relative position.

In the embodiment shown in FIG. 1, the gate marks 11 and 21 are used as the positioning marks, and the first lens 10 and the second lens 20 are positioned such the that the gate marks 11 and 21 have the angle substantially 90 degrees. Thus, the birefringence directions of the first lens 10 and the second lens 20 are orthogonal. Alternatively, it is possible to provide a positioning mark other than the gate mark on the circumference of the first lens 10 and/or the second lens 20 so as to provide a reference for positioning the first lens 10 and the second lens 20 such that the birefringence directions being substantially orthogonal. An embodiment thereof will be shown below.

Figure 4A:
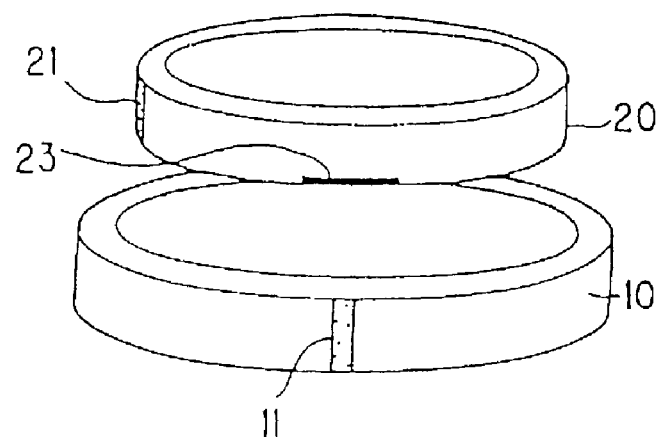
FIGS. 4A to 4C are diagrams showing embodiments of positioning marks formed on the lenses of the optical lens device according to the present invention.

In the embodiment shown in FIG. 4A, the gate mark 11 is used as the positioning mark in the first lens 10 as in FIG. 1. In contrast, a positioning mark 23 is provided to the second lens 20 by applying, for example, an ink. The positioning mark 23 is formed to coincide with the gate mark 11 of the first lens 10 in the vertical direction when the first lens 10 and the second lens 20 are disposed relatively to each other such that the birefringence direction of the first lens 10 and the birefringence direction of the second lens 20 are orthogonal. That is, the positioning mark 23 is formed at a position displaced by about 90 degrees with respect to the gate mark 21 of the second lens 20. Thereby, the birefringence directions of the first lens 10 and the second lens 20 can be directed substantially orthogonal by positioning the gate mark 11 and the positioning mark 23 to coincide in the vertical direction.

In the embodiment shown in FIG. 4A, the width of the positioning mark 23 is larger than the width of the gate mark 11. The birefringence direction of a resin lens can be displaced from the gate direction due to the temperature and pressure gradient at the time of pouring a resin material from the gate into the mold and due to the structure of the mold for molding the lens or the like. Therefore, the positioning mark 23 can be formed with a width in consideration of the displacement.

Moreover, in the case of configuring an objective lens as a combination of resin lenses, the angle formed by the birefringence of the two lenses includes a tolerance error of, for example, about ±5%. Therefore, the width of the positioning mark 23 can be determined so as to absorb or cancel out the tolerance error.

Thereby, even in the case the positioning mark 23 and the gate mark 11 are displaced slightly in the lateral direction in FIG. 4A within a range of the tolerance error, the birefringence directions of the first lens 10 and the second lens 20 can be directed substantially orthogonal so that the relative positioning of the two lenses can be facilitated. Although the gate mark 11 of the first lens 10 and the positioning mark 23 of the second lens 20 are vertically aligned in FIG. 4A, it is also possible to provide the positioning mark by the ink on the first lens 10 side and dispose the lenses such that the positioning mark by the ink on the first lens 10 and the gate mark 21 of the second lens 20 are vertically aligned.

Figure 4B:
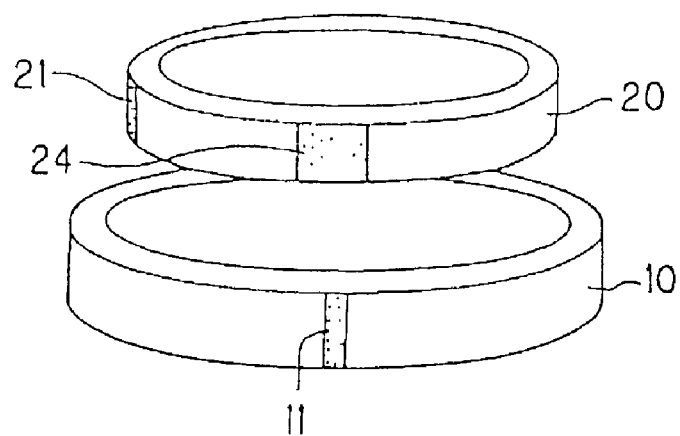

FIG. 4B shows another embodiment. In this embodiment, the positioning mark 24 on the second lens 20 side is formed by striking, ruling, engraving, or the like. The role of the positioning mark 24 is same as the case of FIG. 4A. By forming the positioning mark 24 with a predetermined width, the first lens 10 and the second lens 20 can be positioned easily within the tolerance range. Moreover, it is also possible to provide the positioning mark formed by striking, ruling, engraving, or the like on the first lens 10 side, and dispose the lenses 10 and 20 such that the positioning mark and the gate mark 21 of the second lens 20 are vertically aligned.

Figure 4C:
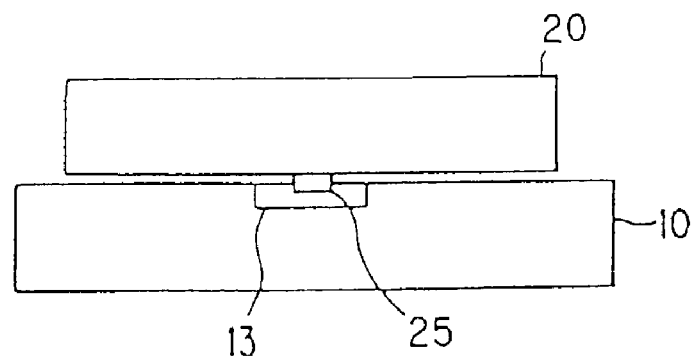

FIG. 4C shows still another embodiment. In this embodiment, a recess part 13 is provided on the circumference of the top surface of the first lens 10, and a projection part 25 is provided on the circumference on the lower surface of the second lens 20. The first lens 10 and the second lens 20 can be positioned such that the projection part 25 is received in the recess part 13. In this embodiment, the recess part 13 and the projection part 25 serve as positioning marks.

Although the positioning marks are formed on the side surface of the lenses for executing the positioning by viewing from the lateral direction in the embodiments shown in FIGS. 4A and 4B, in the case of executing the positioning with the lenses viewed from above in the production process of the lenses, it is possible to form the positioning marks on the aspheric parts 14 and 24 on the top surface of the first lens 10 and the second lens 20.

Moreover, in addition thereto, it is possible to provide positioning marks on various positions of either or both of the first lens and the second lens by various forms, and the lenses can be disposed so that the birefringence directions are substantially orthogonal. That is, the positioning marks can be provided at any position other than the spherical parts 15 and 26 of the lenses for transmitting a laser beam.

Furthermore, since the birefringence of the resin lens has a symmetry of 180 degrees, the above-mentioned positioning marks can be provided also on the opposite side of each lens (that is, the positioning marks are formed on both ends on a diameter of the lens). Thereby, in order to have the positioning marks of the two lenses coincide, the closer one of the two positioning marks of one lens can be aligned with the positioning mark of the other lens. Thus, the rotation angle of either of the lenses to establish the vertical alignment of the positioning marks may be less than 180 degrees, and hence the production process of the objective lens can be simplified.

Moreover, as the positioning mark, the above-mentioned gate mark (cutting mark), the mark provided by an ink as shown in FIG. 4A, the mark provided by ruling, engraving or the like as shown in FIG. 4B, the mark provided as a shape of a notch and a projection part, and the other various forms can be adopted.

[Production Method of an Optical Lens Device]

Figure 5A:
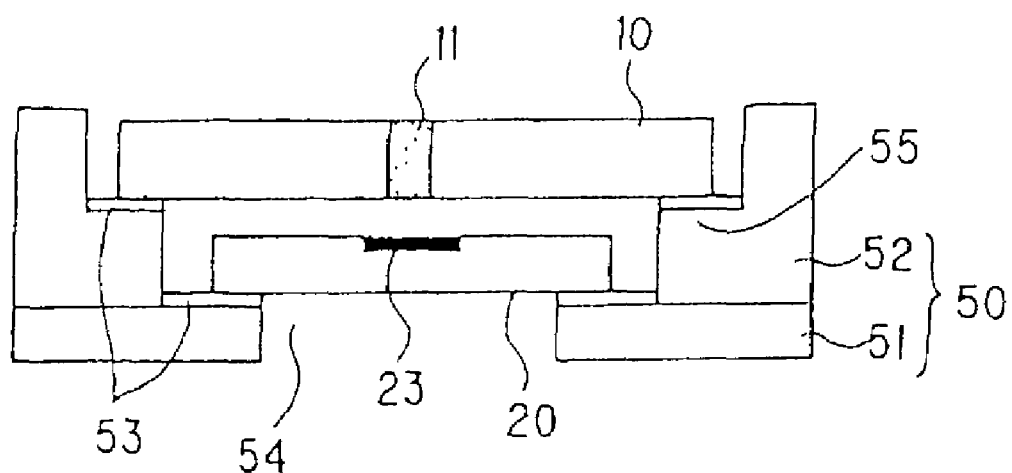
FIGS. 5A and 5B are diagrams showing embodiments of an optical lens device according to the present invention.

Next, a production method for the above-mentioned optical lens device will be explained. FIG. 5A is a side view showing an embodiment of an optical lens device 50 having an objective lens used for an optical pickup. In the embodiment of FIG. 5A, although the first lens 10 and the second lens 20 shown in FIG. 4A are used, the upper and lower relationship of the first and second lenses is opposite to that in FIG. 4A.

In FIG. 5A, the first lens 10 and the second lens 20 are mounted on the assembly 50. The assembly 50 has a ring-like base 51 having an opening 54 at the center, and a supporting part 52 is fixed on the base 51. An adhesive 53 such as an ultraviolet ray hardening type adhesive is applied on the base 51 of the assembly 50, and with the second lens 20 placed thereon, an ultraviolet ray is irradiated. Further, the adhesive 53 is applied also on a seat part 55 of the assembly 50, the first lens 10 is placed on the seat part 55, and then an ultraviolet ray is irradiated. Here, the first lens 10 is disposed on the assembly 50 such that the positioning mark 23 of the second lens 20 and the positioning mark (cutting mark 11) of the first lens 10 are aligned in the vertical direction. Thereby, since the birefringence directions of the first lens 10 and the second lens 20 are aligned substantially orthogonal, the influence of the birefringence, that is problematic in the resin lenses, can be alleviated.

Figure 6:
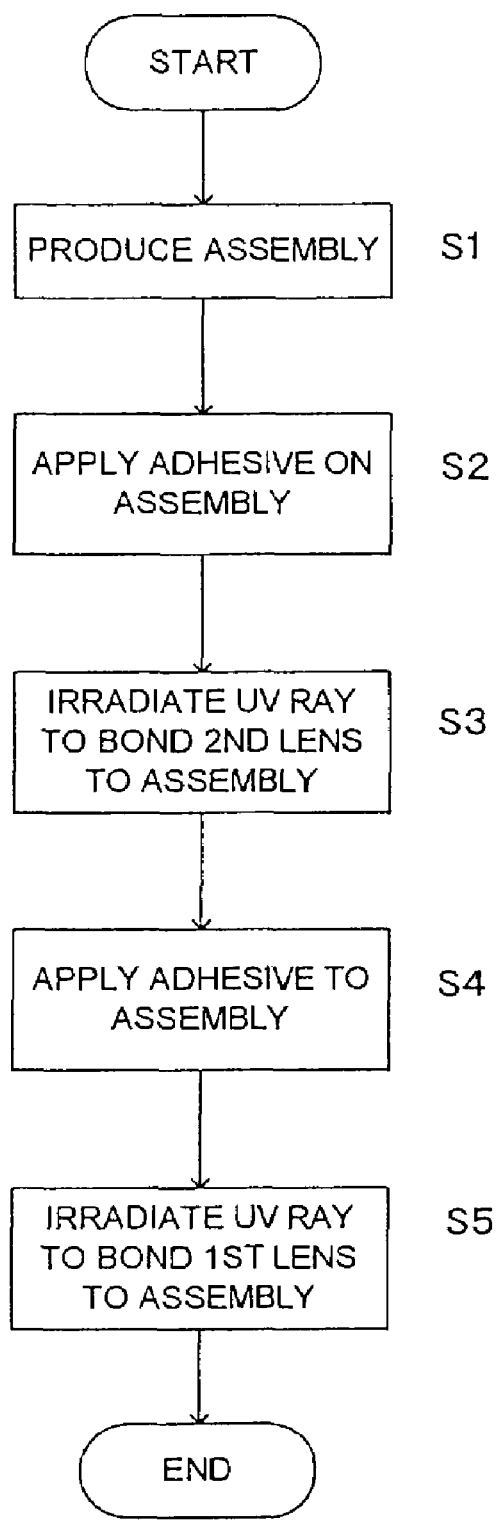
FIG. 6 is a flow chart showing a production method of an optical lens device according to the present invention.

FIG. 6 is a flow chart of the production method of the optical lens device shown in FIG. 5A. In FIG. 6, first, by bonding the base 51 and the supporting part 52, the assembly 50 is formed (step S1). Next, by applying the adhesive 53 on a part of the assembly 50 for mounting the second lens 20 (step S2) and irradiating an ultraviolet ray onto the second lens 20 placed thereon, the second lens 20 is bonded to the assembly 50 (step S3). Then, the adhesive 53 is applied on a part of the assembly 50 for mounting the first lens 10 (step S4), the first lens 10 is placed on the assembly 50 such that the positioning mark 11 of the first lens 10 and the positioning mark 23 of the second lens 20 are vertically aligned, and then an ultraviolet ray is irradiated on the first lens 10 placed on the assembly 50 to bond the first lens 10 to the assembly 50 (step S5). In this way, an optical lens device configuring the objective lens can be produced.

Figure 5B:
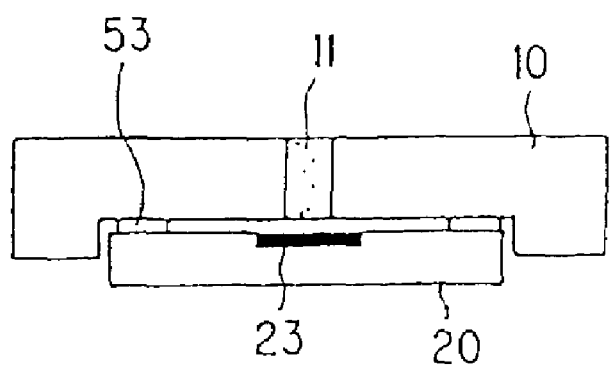

Another embodiment of the optical lens device is shown in FIG. 5B. In this embodiment, the assembly is provided integrally with the lenses such that the first lens 10 also has a function as the assembly. The first lens 10 and the second lens 20 shown in FIG. 4A are also used, like the case of FIG. 5A. In FIG. 5B, the outer circumference part of the first lens 10 is thicker than the inner circumference part, and consequently a recess is formed at the center part of the first lens 10. The recess receives the second lens 20.

In production, the adhesive 53 is applied on the outer circumference part of the bottom surface (upper side surface in FIG. 5B) of the second lens 20, and the first lens 10 is placed thereon. At that time, the first lens 10 is placed on the second lens 20 such that the positioning mark 23 formed on the second lens 20 and the positioning mark (gate mark) 11 formed on the first lens are vertically aligned, and the second lens 20 is received in the recess of the first lens. By hardening the adhesive by irradiating an ultraviolet ray onto the part where the adhesive is applied, the first lens 10 and the second lens 20 are bonded to each other. Thus, an optical lens device with the function as an objective lens is produced.

MODIFIED EMBODIMENT

Although the two lenses are provided as a round lens in the above-mentioned embodiments, the shape, the power, or the like of the lenses to be combined are not particularly limited in the present invention, as long as a designed numerical aperture can be realized by a combination of the two lenses.

As explained, according to the present invention, in case of providing an optical lens device of a high numerical aperture as a combination of resin lenses, since the lenses are disposed such that the birefringence directions of the lenses are directed with a predetermined angle, more preferably substantially orthogonal, the influence of the birefringence of the lenses can be alleviated as a whole and a signal can be recorded or reproduced stably.

Moreover, although the above description has been given for embodiments of an objective lens used for an optical pickup of an optical disc recording or reproducing device, the optical lens device of the present invention can be used for other applications as well.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2001-209607 filed on Jul. 10, 2001 including the specification, claims, drawings and summary is incorporated herein by reference in its entirety.

What is claimed is:

1. An optical lens device comprising two molded resin lenses, each of the two lenses having birefringence in a specific direction in a surface of the lens, the two lenses being positioned relative to each other such that directions of the birefringence of the lenses form a predetermined angle, wherein each of the two lenses has at least one position mark at an end part in the birefringence direction, wherein the positioning marks are formed in a producton process of the molded resin lenses, and wherein the two lenses are positioned such that diameter directions of the lenses including the positioning marks are substantially orthogonal with each other.

2. The optical lens device according to claim 1, wherein one of the two lenses has at least one positioning mark at an end part in the birefringence direction and the other of the two lenses has at least one positioning mark at an end part in a direction substantially orthogonal to the direction of the birefringence, and wherein the two lenses are positioned such that the positioning marks coincide with each other.

3. The optical lens device according to claim 2, wherein one of the positioning marks has a width corresponding to a tolerance.

4. The optical lens device according to claim 2, wherein one of the positioning marks is a recess part formed on one of the lens and having a predetermined width, and the other of the positioning marks is a projection part formed on the other one of the lens and having a shape to be received in the recess part.

5. The optical lens device according to claim 1, wherein the positioning marks are formed on both the end parts of the lens in the birefringence direction or in the direction substantially orthogonal to the birefringence direction.

6. The optical lens device according to claim 1, wherein at least one of the positioning marks is a cutting mark formed in a production process of the lens.

7. The optical lens device according to claim 1, further comprising an assembly for supporting the two lenses on an identical axis.

8. The optical lens device according to claim 1, wherein one of the two lenses is integrally mounted in a receiving part formed in the other lens.

9. The optical lens device according to claim 1, wherein the numerical aperture produced by the two lenses is not smaller than 0.7 and not larger than 1.

10. A production method of an optical lens device comprising the steps of:
   mounting a first lens on an assembly and
   mounting a second lens on the assembly such that directions of birefringence of the lenses form a predetermined angle, wherein each of the first and the second lenses has at least one position mark at an end part in the birefringence direction, wherein the positioning marks are formed in a producton process of the molded resin lenses, and wherein the two lenses are positioned such that diameter directions of the lenses including the positioning marks are substantially orthogonal with each other.

11. A production method of an optical lens comprising the steps of:
   disposing a second lens within a receiving part formed in a first lens such that a birefringence direction of the second lens and a birefringence direction of the first lens form a predetermined angle, and
   fixing the second lens to the first lens, wherein each of the first and the second lenses has at least one position mark at an end part in the birefringence direction, wherein the positioning marks are formed in a producton process of the molded resin lenses, and wherein the two lenses are positioned such that diameter directions of the lenses including the positioning marks are substantially orthogonal with each other.

12. An optical lens device comprising two molded resin lenses positioned adjacently to each other, each of the molded resin lenses having a mark formed in a production process of the molded resin lens,
   wherein the marks are formed at such positions that resin flow directions of the resin molded lenses at a time of resin molding process are orthogonal to each other when the marks are positioned in a predetermined positional relationship with each other.

13. The optical lens device according to claim 12, wherein the marks are positioned such that diameter directions of the lenses including the marks substantially have an angle of 0 degree, +90 degrees or 180 degrees.

14. The optical lens device according to claim 12, wherein the mark is a cutting mark formed by a cutting process after a resin molding process in the production process of the molded resin lens.

* * * * *